United States Patent
Takamura et al.

(10) Patent No.: US 8,798,836 B2
(45) Date of Patent: Aug. 5, 2014

(54) CONTROL DEVICE FOR HYBRID VEHICLE

(75) Inventors: Yutaka Takamura, Yokohama (JP);
Hiroyuki Ashizawa, Yokohama (JP);
Kaori Tanishima, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/880,789

(22) PCT Filed: Oct. 4, 2011

(86) PCT No.: PCT/JP2011/072852
§ 371 (c)(1),
(2), (4) Date: Apr. 22, 2013

(87) PCT Pub. No.: WO2012/056855
PCT Pub. Date: May 3, 2012

(65) Prior Publication Data
US 2013/0204479 A1 Aug. 8, 2013

(30) Foreign Application Priority Data
Oct. 25, 2010 (JP) .................. 2010-238150

(51) Int. Cl.
*B60W 20/00* (2006.01)
*B60K 6/46* (2007.10)
*B60K 6/48* (2007.10)
*B60W 10/06* (2006.01)
*F02D 29/02* (2006.01)
*B60W 10/02* (2006.01)
*B60K 6/547* (2007.10)
*B60W 10/08* (2006.01)
*B60K 17/02* (2006.01)
*F02N 11/08* (2006.01)

(52) U.S. Cl.
CPC ....... *B60W 20/40* (2013.01); *B60W 2510/0241* (2013.01); *B60W 2710/025* (2013.01); *B60K 17/02* (2013.01); *F16D 2500/30407* (2013.01); *B60K 6/46* (2013.01); *B60K 6/48* (2013.01); *F16D 2500/50287* (2013.01); *B60W 10/06* (2013.01); *B60W 2710/027* (2013.01); *B60W 20/00* (2013.01); *F02D 29/02* (2013.01); *B60W 10/02* (2013.01); *Y02T 10/6221* (2013.01); *B60W 2540/10* (2013.01); *Y02T 10/48* (2013.01); *B60K 6/547* (2013.01); *Y02T 10/6286* (2013.01); *B60W 2600/00* (2013.01); *B60W 10/08* (2013.01); *F16D 2500/1066* (2013.01); *F02N 11/0851* (2013.01); *Y10S 903/93* (2013.01)
USPC ............. 701/22; 180/65.245; 180/65.265; 903/930

(58) Field of Classification Search
CPC ..... B60W 20/00; B60W 10/02; B60W 10/04; B60W 10/06; B60W 10/08; B60K 6/46
USPC ............ 701/22; 180/65.245, 65.265; 903/930
See application file for complete search history.

(56) References Cited

U.S. PATENT DOCUMENTS
2007/0227790 A1* 10/2007 Tanishima .................. 180/65.2

FOREIGN PATENT DOCUMENTS
| JP | 2007-69817 | | 3/2007 |
| JP | 2007-261498 | A | 10/2007 |
| JP | 2010-111144 | A | 5/2010 |
| JP | 2010-111194 | A | 5/2010 |

* cited by examiner

*Primary Examiner* — Mary Cheung
*Assistant Examiner* — Brian P Sweeney
(74) *Attorney, Agent, or Firm* — Young Basile

(57) ABSTRACT

A control device is provided to reduce an engine start shock when there is a request to start the engine in response to the accelerator pedal depression and the slip polarity of the second clutch is negative. The control device for a hybrid vehicle has an engine, a motor/generator, a first clutch, a second clutch, and a mechanism for an engine start permission controlling operation. The first clutch is selectively engaged during engine start in which the motor generator is operated as the starter motor. The second clutch is interposed between the motor/generator and tires, and is slip-engaged when the engine is started. The mechanism for the engine start permission controlling operation delays starting the engine until the slip polarity becomes positive when the engine start request is produced and the slip polarity of the second clutch is negative.

4 Claims, 11 Drawing Sheets

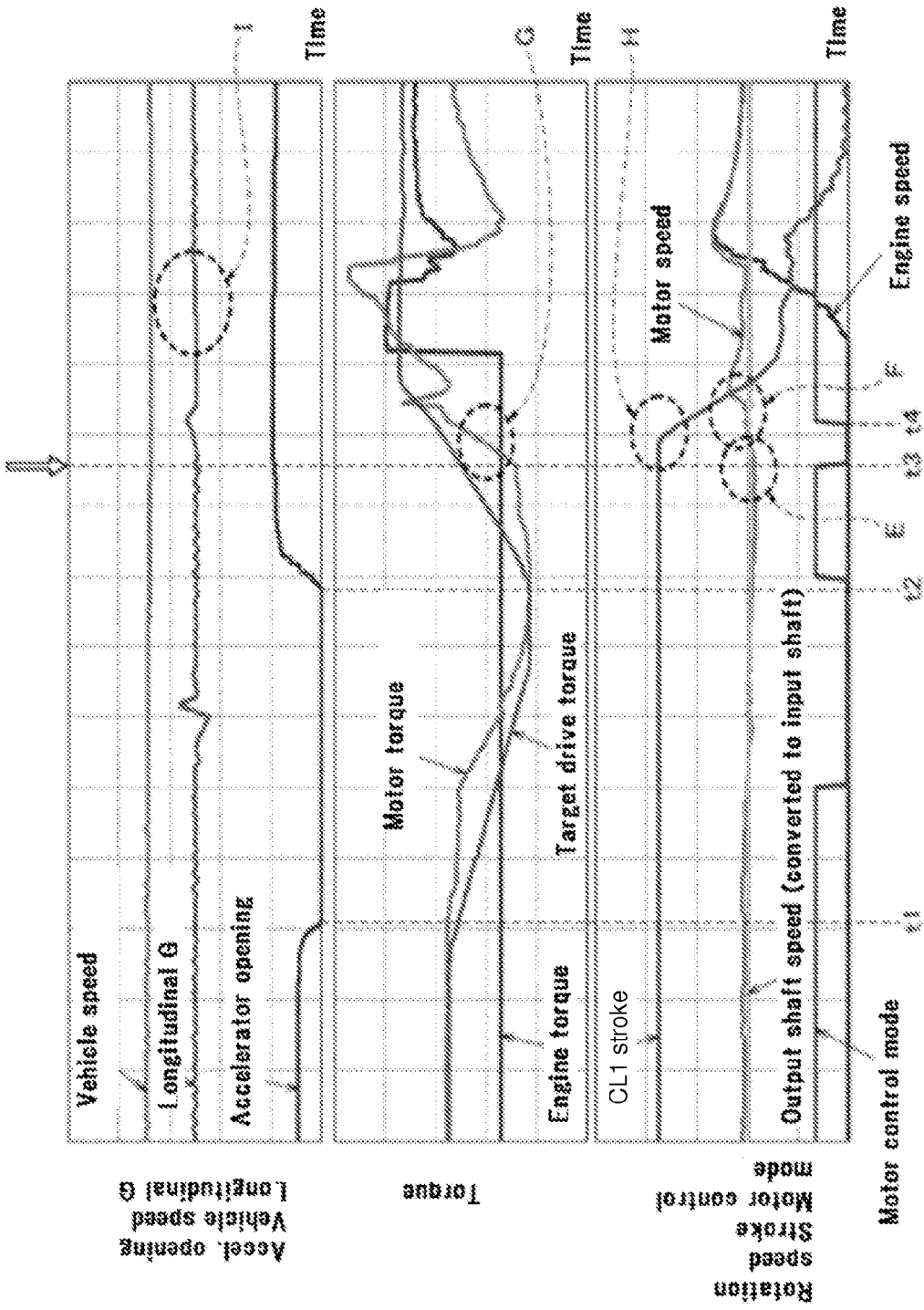

CONTROL DEVICE FOR HYBRID VEHICLE

TECHNICAL FIELD

The present invention relates to a control device for a hybrid vehicle to initiate an engine start control in accordance with an engine start request in the powertrain system provided with one motor and two clutches.

BACKGROUND

Conventionally, in a hybrid vehicle with one motor 2 clutch power train system, it has been known that, when the engine is started in response to switching request from "EV mode" to "HEV mode" associated with the accelerator opening increase by depressing on the accelerator pedal, engagement of a first clutch CL1 is initiated to be engaged before a second clutch CL2 begins to slip to perform an engine start while slipping the second clutch CL2 (for example, see Japanese Laid-Open Patent Publication No. 2007-69817).

In a hybrid vehicle with a power train system of one-motor, 2-clutch type, in an EV travel or running mode during coasting state with the accelerator being released, for example, during a μ slip control or gear change/shift control, a coast driving takes place sometimes while the state of the second clutch CL2 is in negative slip state. Here, the "μ slip control (micro slip control)" refers to the control in which the second clutch CL2 is slightly slid in order to reduce the friction torque in the EV travel.

However, in a conventional control device of the hybrid vehicle, when there is engine start request, it is configured that cranking of the engine starts immediately upon an engine start request. Therefore, after the cranking start, when the slipping direction of the second clutch changes its polarity from negative to positive, the slip of the second clutch CL2 disappears temporarily by the zero-crossing. There has been a problem of possibility that the variation of the input torque due to the engagement of the first clutch CL1 is not effectively shut off so that an engine start shock may occur.

BRIEF SUMMARY

The present invention was made in view of the above problems and is intended to provide a control device for a hybrid vehicle which can reduce the engine start shock when there is the engine start request associated with the accelerator increase and the slip polarity of the second clutch is negative.

In order to achieve the above object, the control device for a hybrid vehicle according to the present invention is configured to comprise an engine, a motor, a first clutch, a second clutch, and a mechanism or unit for a cranking start permission control. The first clutch is interposed between the engine and the motor and is subject to being engaged when starting the engine using the motor as a starter motor.

The second clutch is interposed between the motor and drive wheels and is slip-engaged when starting the engine. The cranking start permission control mechanism withholds or delays, until the slip polarity of the second clutch becomes positive, when the request for the start of engine cranking is made in response to a drive force request associated with increase in accelerator opening and when the slip polarity of the second clutch is negative.

Accordingly, such a control is performed in which, when the engine start request is initiated in response to increase in accelerator opening and when the slip polarity of the second clutch is being negative, the mechanism for cranking start permission control withholds the start of the cranking process until the slip polarity turns to be positive.

In other words, assuming that the engine start control would be carried out in response to the engine start request, when the slip polarity of the second clutch turns from negative to positive, the slip of the second clutch is eliminated temporarily due to zero crossing with a clutch engagement state being established so that the effect to block the input torque fluctuation due to engine start would be reduced. To cope with this situation, at the engine start request in response to accelerator depression and at the slip polarity of the second clutch being negative, in view of a possible reduction in blocking effect of the input torque, the start of the engine cranking will be delayed. Thus, by starting the cranking after waiting for the slip polarity of the second clutch to become positive, engine start shock is reduced. As a result, when there is an engine start request in response to the accelerator increase and when the slip polarity of the second clutch is negative, the engine start shock will be able to be reduced.

BRIEF DESCRIPTION OF THE DRAWINGS

The description herein makes reference to the accompanying drawings wherein like reference numerals refer to like parts throughout the several views, and wherein:

FIG. 15 is a timing chart in the first embodiment, when there is an engine start request in response to accelerator depression or increase during coast running with CL2 being slipped in negative at EV running or travel, showing an accelerator opening, vehicle speed, longitudinal G, torque (motor torque, engine torque, and target drive torque), rotation speed (output shaft rotation speed, motor rotation speed), CL1 stroke, and motor control mode, respectively.

DETAILED DESCRIPTION

Hereinafter, the best mode to implement the control device for an electrical hybrid vehicle in a first embodiment according to the present invention is described with reference to accompanying drawings. First, description is made of the configuration.

Figure 1:
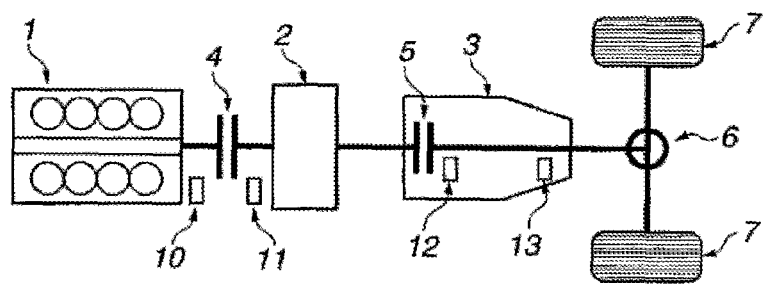
FIG. 1 is a schematic view of a power train of a hybrid vehicle to which a first embodiment of a control device is applied.

FIG. 1 shows a power train system to which the first embodiment according to the present invention is applied. The configuration of the power train system is now described referring to FIG. 1.

As shown in FIG. 1, the power train system in the first embodiment is provided with an engine 1, a motor/generator 2, an automatic transmission 3, a first clutch 4, a second clutch 5, a differential gear 6 and tire (drive wheels) 7.

The hybrid vehicle in the first embodiment is configured in a power train system including engine 1, one-motor two-clutch system. The running or drive modes includes an "HEV mode" with the first clutch 4 engaged, an "EV mode" with first clutch 4 released or disengaged, and "WSC mode" with the second clutch 5 being in a slip-state.

The output shaft of the engine 1 is connected to input shaft of the motor/generator 2 (abbreviated as MG) via first clutch 4 (abbreviated as CL1), whose torque capacity is variable.

The output shaft of motor/generator 2 is coupled with the input shaft of automatic transmission 3 (abbreviated as AT).

The output shaft of automatic transmission 3 is coupled with tire or wheels 7 via differential gear 6.

An engagement element of torque capacity variable clutches and brakes that play a role of different power transmissions within automatic transmission 3 in accordance with its shift state is used for second clutch 4 (abbreviated as CL2). Thus, automatic transmission 3 synthesizes the power of engine 1 inputted via first clutch 4 and the power inputted from motor-generator 2 and outputs the synthesized power to tire wheels 7.

First clutch 4 and second clutch 5, for example, may be a wet-type multiple plate clutch that can continuously control an oil flow quantity and a hydraulic pressure by means of a proportional solenoid. This power train (drive system) has two drive (travel) or running modes in accordance with a connection state of first clutch 4, namely, an EV mode in which the vehicle travels only with power of motor-generator 2 in a disconnection (release) state of first clutch 4, and an HEV mode in which the vehicle travels with power of both of engine 1 and motor-generator 2 in a connection (engagement) state of first clutch 4.

Various sensors for this power train include an engine speed sensor 10 that detects a revolution speed of engine 1, an MG revolution sensor 11 that detects a revolution speed of motor-generator 2, an AT input revolution sensor 12 that detects an input shaft revolution speed of automatic transmission 3 and an AT revolution speed sensor 13 that detects an output shaft revolution speed of automatic transmission 3.

Figure 2:
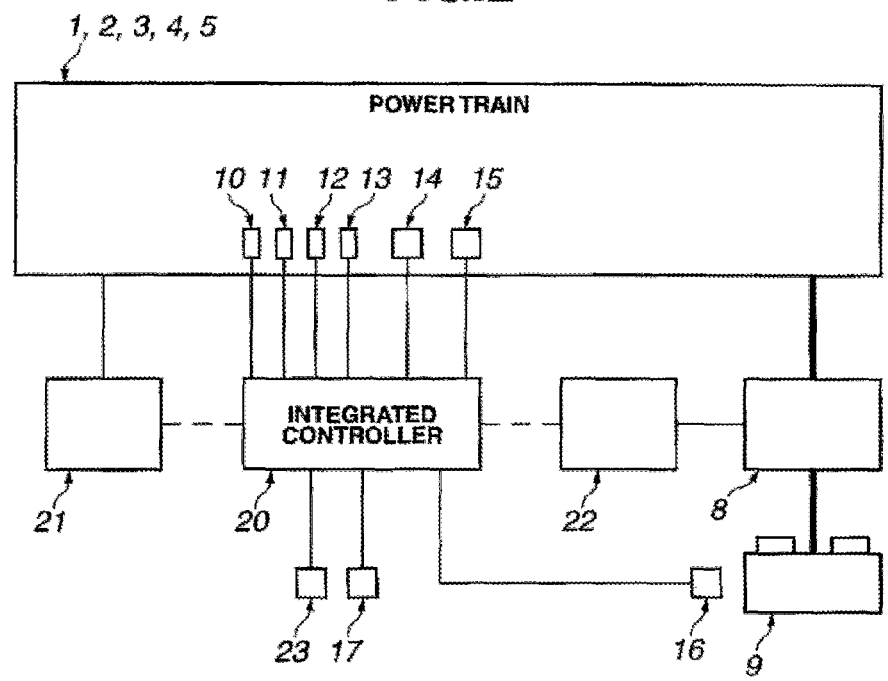
FIG. 2 is a configuration diagram of a control system to which the control system of the first embodiment is applied.

FIG. 2 shows a control system configuration of the hybrid vehicle to which the control apparatus in the first embodiment is applicable. The control system configuration will, hereinafter, be described on a basis of FIG. 2.

As shown in FIG. 2, a control system according to the first embodiment according to the present invention includes an integrated controller 20, an engine controller 21, a motor controller 22, an inverter 8, a battery 9, a solenoid valve 14, a solenoid valve 15, an accelerator opening angle sensor 17, a brake hydraulic pressure sensor 23 and an SOC sensor 16.

Integrated controller 20 integrally controls an operating point of the power train. This integrated controller 20 selects a running or drive mode that can realize the drive force that a vehicle driver desires in accordance with accelerator opening angle APO, a battery charge state SOC and a vehicle speed VSP (which is proportional to the output shaft rotation or revolution speed of the automatic transmission). Then, integrated controller 20 issues a target MG torque or a target MG revolution speed to motor controller 22, a target engine torque to engine controller 21 and a drive signal to each or either of solenoid valves 14, 15.

Engine controller 21 controls engine 1. Motor controller 22 controls motor-generator 2. Inverter 8 drives motor-generator 2. Battery 9 stores electrical energy. Solenoid valve 14 controls the hydraulic pressure of first clutch 4. Solenoid valve 1 controls the hydraulic pressure of second clutch 5. Accelerator opening angle sensor 17 detects accelerator opening angle APO. The CL1 stroke sensor 23 detects a stroke amount of clutch piston of the first clutch 4 (CL1). SOC sensor 16 detects a charge state of battery 9.

Figure 3:
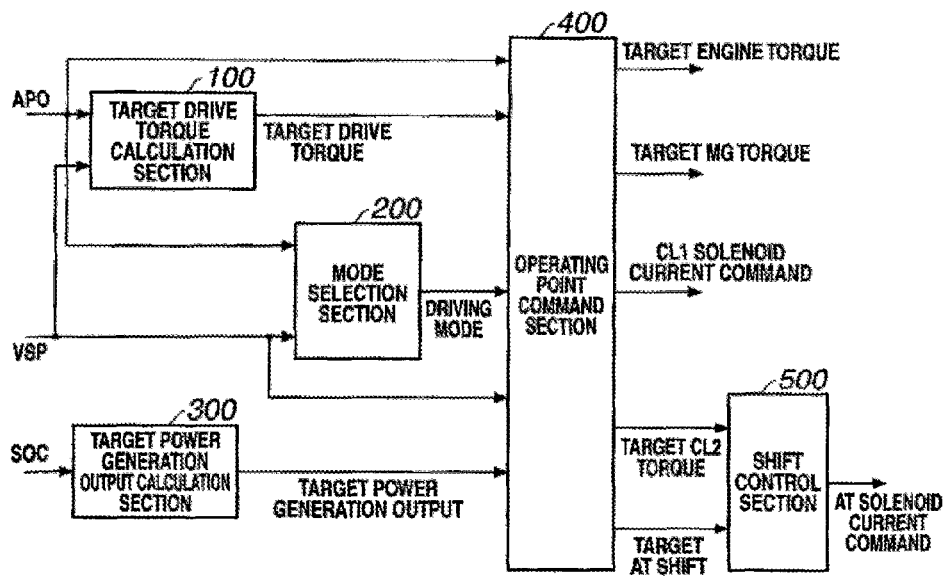
FIG. 3 is an arithmetic block diagram of an integrated controller of the first embodiment.

FIG. 3 shows a calculation or arithmetic block diagram representing integrated controller 20 in the first embodiment. In the following, a configuration of the integrated controller 2 will be described.

As shown in FIG. 3, integrated controller 20 includes a target drive torque calculation section 100, a mode selection section 200, a target power generation output calculation section 300, an operating point command section 400 and a shift control section 500.

Figure 4A:
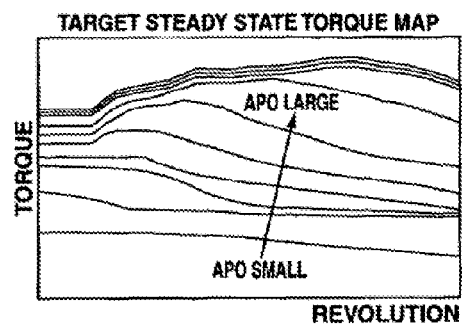
FIGS. 4A and 4B respectively shows a steady-state target torque map (a) and MG assistance torque map (b) for use in the control system accordingly to the first embodiment.
Figure 4B:
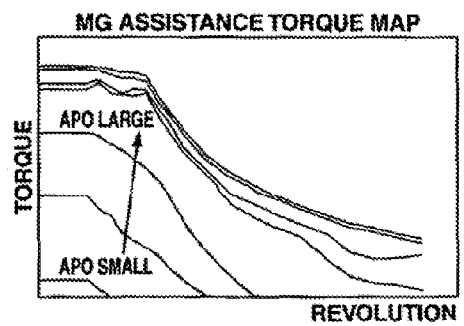

Target drive torque calculation section 100 calculates a target steady state drive torque and a MG assistance torque based on accelerator opening angle APO and vehicle speed VSP using the target steady state drive torque map shown in FIG. 4(*a*) and the MG assistance torque map shown in FIG. 4(*b*), respectively.

Figure 5:
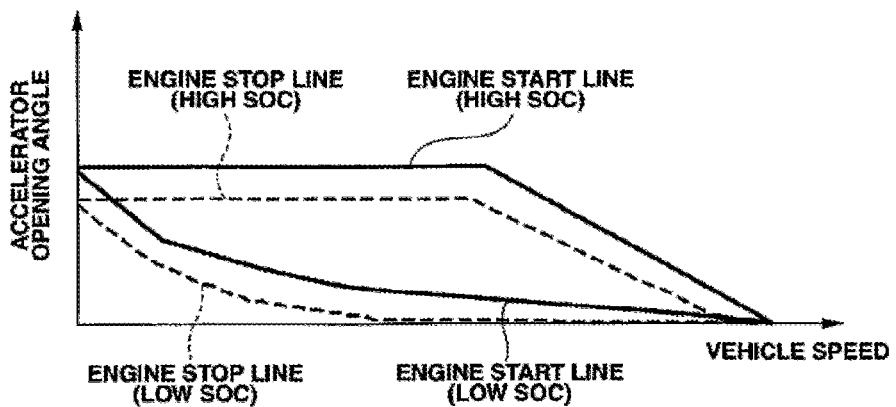
FIG. 5 shows a map representing engine start/stop lines used in the control system according to the first embodiment.

Mode selection section 200 calculates the desired drive or running mode of HEV mode or EV mode using an engine start-and-stop line map set according to accelerator opening angle APO for each vehicle speed shown by example in FIG. 5. The engine start line and the engine stop line are set such that, as battery SOC becomes lower, they are reduced in a direction in which accelerator opening angle APO becomes small. As represented by the characteristics of the engine start lines (high SOC, low SOC) and the engine stop lines (high SOC, low SOC), engine start/stop varies with battery SOC (state of charge).

It should herein be noted that, in an engine start process, integrated controller 20 controls a torque capacity of second clutch 5 such that second clutch 5 is slipped at a time point at which accelerator opening angle APO exceeds the engine start line shown in FIG. 5 in the EV mode state. Then, after a determination that the second clutch 5 has started the slip, engagement of first clutch 4 is initiated to raise the engine revolutions. If the engine revolutions have reached a revolution speed at which engine 1 can be in an initial explosion state, engine 1 is in a combustion state. When the motor revolution speed and the engine speed become close to each other, first clutch 4 is completely engaged. Thereafter, second clutch 5 is locked up, and the mode transition to the HEV mode is carried out.

Figure 6:
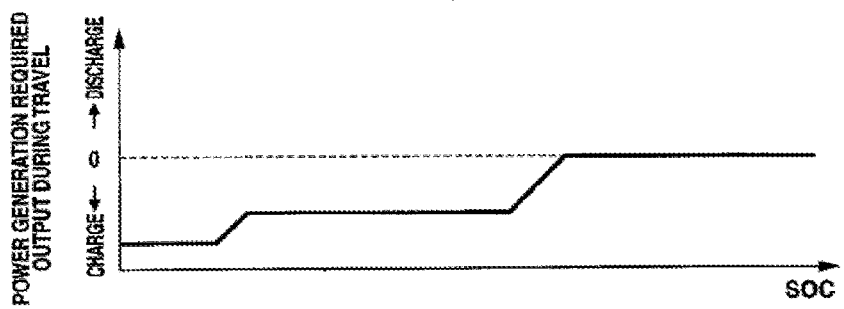
FIG. 6 is a characteristic graph representing a power generation output required during travel with respect to battery SOC employed in the control device of the first embodiment.
Figure 7:
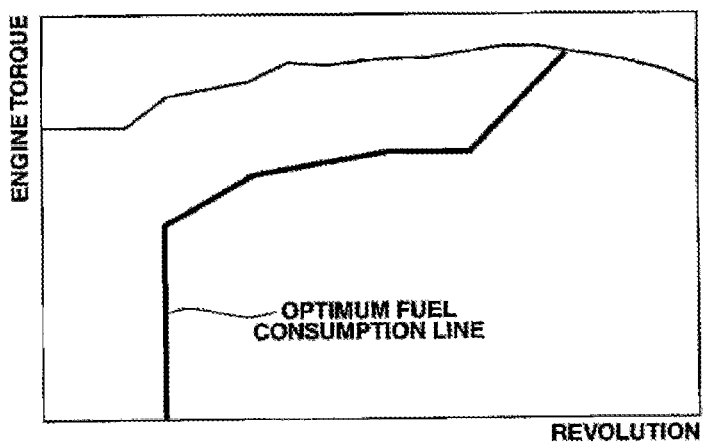
FIG. 7 is a characteristic graph representing an optimum fuel consumption line used in the control system in the first embodiment.

Target power generation output calculation section 300 calculates a target power generation output from battery SOC using a power generation output required during travel using a map shown in example in FIG. 6. In addition, target power generation output calculation section 300 calculates an output required to increase an engine torque from its current operating point to an optimum fuel consumption line shown in FIG. 7, and compares the calculated required output with the target power generation output. Then, target power generation output calculation section 300 adds the lesser of the two compared output values to the engine output.

Operating point command section 400 receives accelerator opening angle APO, the target steady state torque, the target MG assistance torque, the target drive or running mode, vehicle speed VSP and the required power generation output. Then, operating point command section 400 calculates a transient target engine torque, a target MG torque, a target CL2 torque capacity, a target gear shift ratio and a CL1 solenoid current command.

Figure 8:
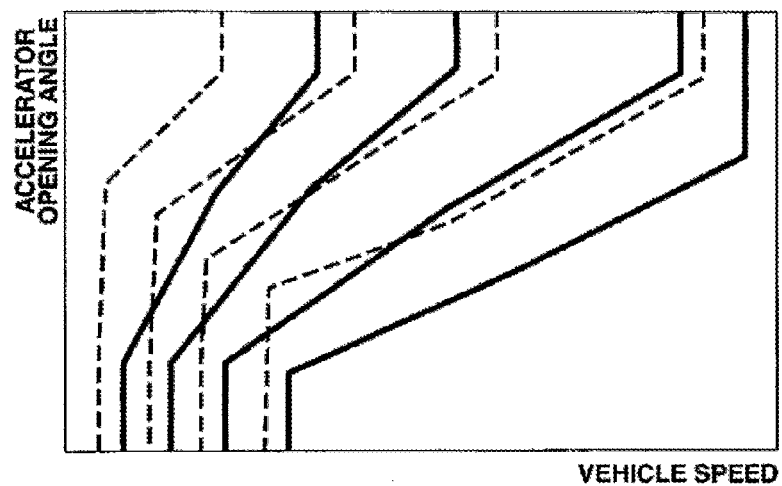
FIG. 8 is a shift map showing one example of gear shift lines in an automatic transmission in the first embodiment.

Shift control section 500 operably controls the solenoid valves within automatic transmission 3 to achieve the target CL2 torque capacity and the target gear shift ratio. FIG. 8 shows one example of a shift line map used in the gear shift control. Shift control section 500 determines to which stage the vehicle should be shifted from the present shift stage using vehicle speed VSP and accelerator opening angle APO in the shift line map and performs a gear shift to the subsequent stage by controlling a shift clutch if a shift request occurs.

Figure 9:
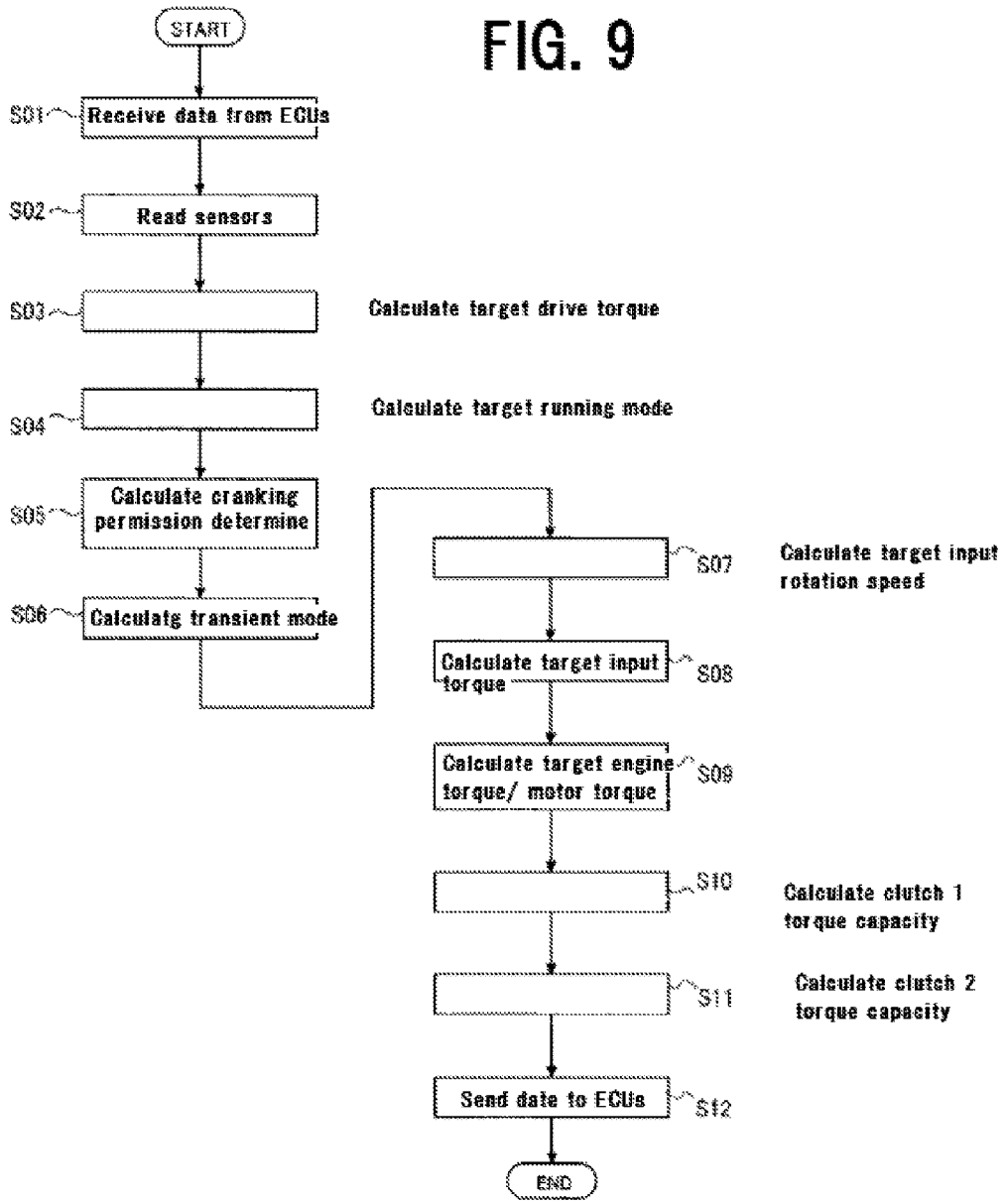
FIG. 9 is a flowchart showing a configuration as well as flow of integrated or unified arithmetic control process executed by the integrated controller of the first embodiment.

FIG. 9 shows a configuration as well as flow of integrated or unified arithmetic control process executed by the integrated controller 20. Now, each step in FIG. 9 is described.

In step S01, control receives data from respective controllers, and, in step S02, reads the sensor values to acquire the information needed for subsequent calculations.

In step S03, following reading of the sensor value in step S02, a target drive torque is calculated depending on the vehicle speed VSP, the accelerator opening APO, the braking force, then control proceeds to step S04.

Figure 10:
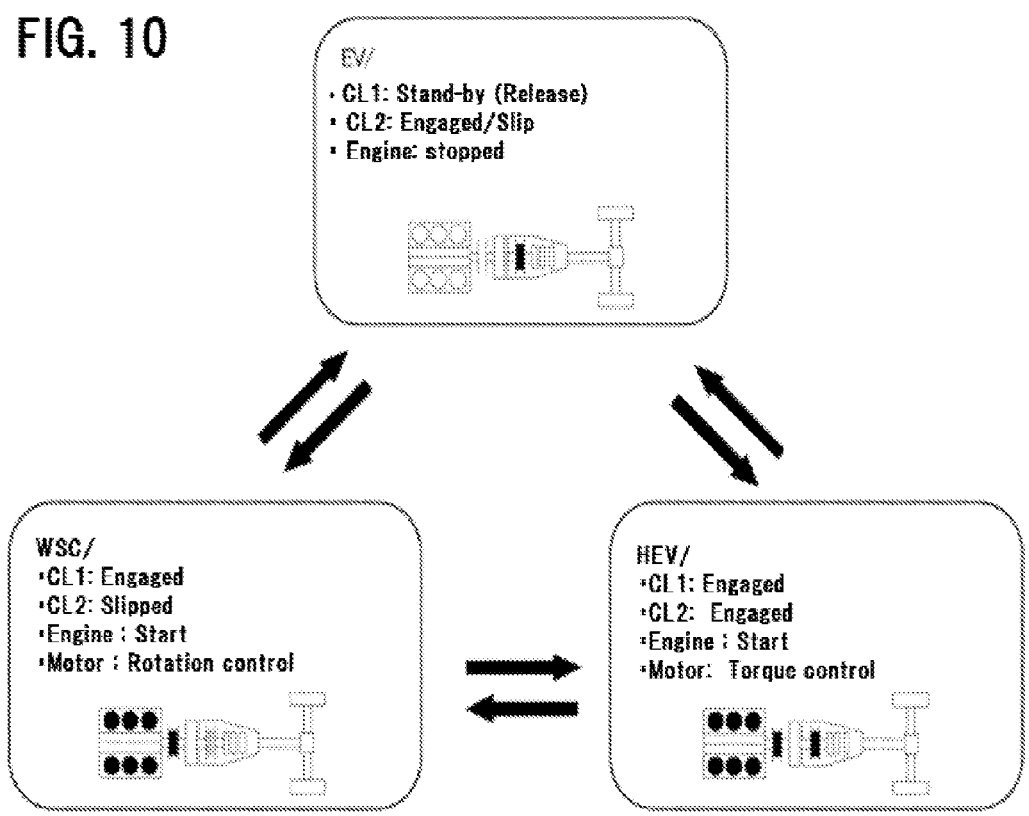
FIG. 10 is a target running mode diagram illustrating an example of transitions in target drive or running modes attained in a target running mode calculation process executed in step S05 in FIG. 9.

At step S04, subsequent to calculating the target drive torque at step S03, depending on the vehicle states such as target drive torque, the battery SOC, the accelerator opening APO, the vehicle speed VSP, road gradient, etc., to select a target drive or running mode, control proceeds to the step S06. For reference, in FIG. 10, an excerpt of transitions of target drive or running modes among "EV mode", "HEV mode" and "WSC mode". In operation of this step S04, when the mode transition from the "EV mode" to either the "WSC mode" or the "HEV mode," an engine starting process will be carried out.

Figure 13:
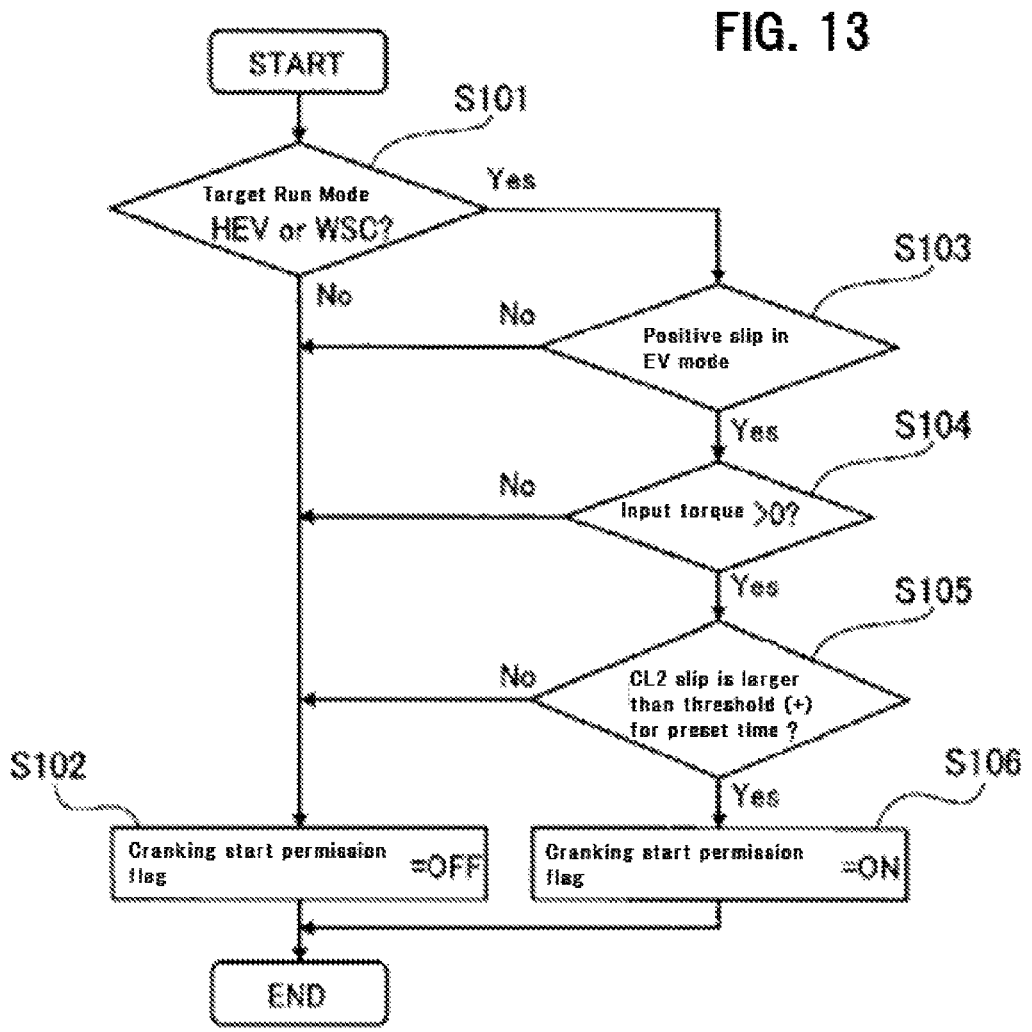
FIG. 13 is a flowchart showing the configuration and flow of a calculation process for determination on cranking start permission.

In step S05, following the target drive mode calculation in the step S04, it is determined the start permission of the engine cranking by the motor speed and control proceeds to step S06 (see FIG. 13). In case of the drive force request, including the one responsive to an accelerator opening, and in the case of negative slip polarity of second clutch 5 (CL2), engine cranking is to be kept waiting until the polarity of the slip becomes positive. The details will be described later with reference to FIG. 13.

Figure 11:
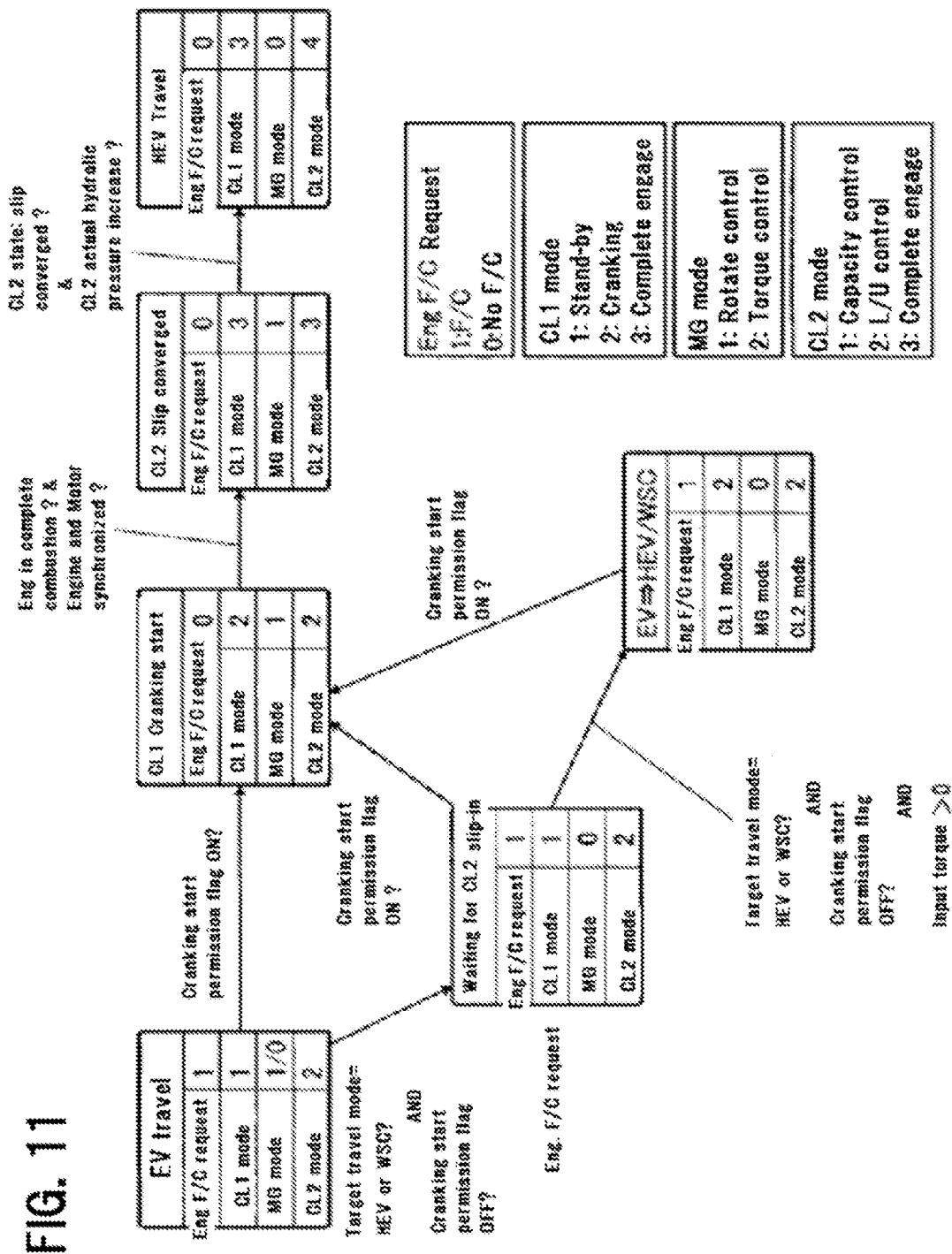
FIG. 11 is an example of transition drive mode calculation process executed in step S06 in FIG. 9.

In step S06, following the calculation of cranking start permission determination in step S05, in accordance with the states of first clutch 4 (CL1) and of the second clutch 5 (CL2) at the engine start, the calculations of motor control mode and a transient drive mode to select an engine startup timing are performed and control proceeds to step S07 (see FIG. 11). As shown in FIG. 11, operation of the transient drive mode manages the running state based on the slip states in first clutch 4 (CL1) and the second clutch 5 (CL2), the engine complete explosion or combustion state thereby switching states of each device associated. In this calculation, with reference to the cranking start permission flag determined in step S05, determine is made of the motor speed control. Furthermore, when the polarity of the input torque becomes positive, engagement of the first clutch 4 (CL1) is initiated. The reason for this is because, although the determination with respect to occurrence or non-occurrence of slip state may be made based on the absolute value of input torque compared to clutch torque capacity, since cranking is intended to take place in a positive slip, only after determination that the direction of the slip of the second clutch 5 (CL2) is positive, the engagement operation of the first clutch 4 (CL1) is started.

In step S07, subsequent to the transient drive mode calculation in step S05, in accordance with the running state and motor control state determined in step S05, the target input rotation speed is calculated and the control proceeds to step S08.

Note that, during cranking operation at engine start, control is performed to maintain a slip in the second clutch 5 (CL2). After the complete combustion of engine 1 has been confirmed, the second clutch 5 (CL2) will be controlled to converge the slipping.

Figure 12:
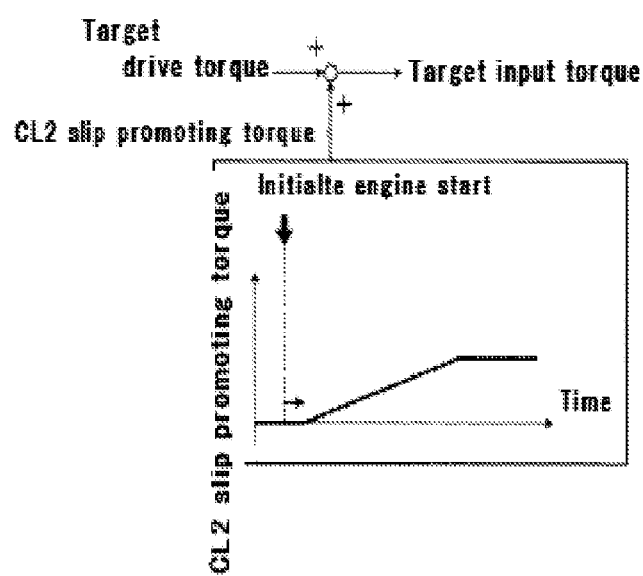
FIG. 12 is an example of calculation block diagram showing a target input torque calculation process executed in step S08 in FIG. 9.

In step S08, following the target input rotation speed calculation in step S07, a target input torque is calculated based on the target drive torque and in consideration of protection of the various devices, and the process proceeds to step S09 (see FIG. 12). At the engine start, as shown in FIG. 12, a CL2 slip promoting torque will be added to the target drive torque in order to allow the second clutch 5 (CL2) to slip easily. In this instance, by decreasing the CL2 torque capacity while executing the present calculation, slipping state may be facilitated by creasing such a state in which an actual input torque is larger than a torque capacity of the second clutch.

In step S09, following the calculation of the target input torque in step S08 and considering the target input torque calculated in step S08 as well as the power of generation requirements, the torque distribution to the motor generator 2 and the engine 1 will be determined to calculates each target value, and the control proceeds to step S10.

In step S10, following the target engine torque/motor torque calculations in step S09 and in accordance with the instructions or commands obtained in the transient drive mode operation in step S06, the target clutch torque capacity of a first clutch 4 (CL1) is calculated, and control proceeds to step S11.

In step S11, following the calculation of the target clutch 1 torque capacity, in accordance with the running states determined in step S06, CL2 slip rotation speed, the target cutch torque capacity of the second clutch 5 (CL2) is calculated, and control proceeds to step S12.

In step S12, following the target clutch 2 torque capacity calculation in step S11, data will be transmitted to each controller, and the process ends.

FIG. 13 shows the configuration and flow of the operation of cranking start permission determination executed in step S05 in FIG. 9. (Cranking start admission control mechanism). In the following, each step in FIG. 13 is described. Note that this process starts at EV travel.

In step S101, it is determined whether or not the target drive or running mode is the "HEV mode" or the "WSC mode". Control proceeds to step S103 when determined "YES" (in the case of presence of engine start request in HEV, WSC modes), while, control proceeds to step S102 when determined "NO" (in the case of no engine start request during EV mode). Stated another way, when the target drive mode is switched to "HEV mode" or "WSC mode" from the EV running mode, engine start-up request associated with the accelerator increase is issued.

In step S102, the cranking start permission flag is set to OFF and control ends, following either the determination in step S101 where no engine start request is generated during EV mode, the determination in step S103 where negative slip is detected during EV travel, the determination in step S104 where input torque is equal to or less than "zero", or the determination in step S105 where CL2 slip does not exceed a predetermined value for a predetermined period of time.

In step S103, after judging in step S101 that engine start request is present in either HEV or WSC mode, a determination whether or not a positive slip has been attained during EV travel is made. If YES (positive slip detected during EV travel), control proceeds to step S104, while, if NO (negative slip at EV travel), control proceeds to step S102.

In step S104, after judging in step S103 that a positive slip is determined during EV travel, input torque will be checked to be greater than "zero". If YES (input torque is greater than "zero"), control proceeds to step S105, while if NO (input torque≤0), then control proceeds to step S102.

In step S105, following the determination in step S104 that the input torque is greater than "zero", a determination is made whether or not the state of CL2 slip is greater than a threshold value (positive) has elapsed for a predetermined time. When YES (the state of CL2 slip being larger than the threshold value elapsed for the predetermined time), control proceeds to step S106, while, when NO (the state of CL2 slip being larger than the threshold value has not yet elapsed for the predetermined time), control proceeds to step S102.

In step S106, after judging that the state in which CL2 slip>threshold has elapsed for the predetermined time in step S105, the cranking start permission flag is set from OFF to ON, and control ends.

Now, operations will be described. First, description will be made of the "technical problem in a comparative example". Subsequently, the operations of the hybrid vehicle in the first example will be described by dividing into sections, "operation process of cranking start permission determination" and "operation of cranking start permission control", respectively.

Figure 14:
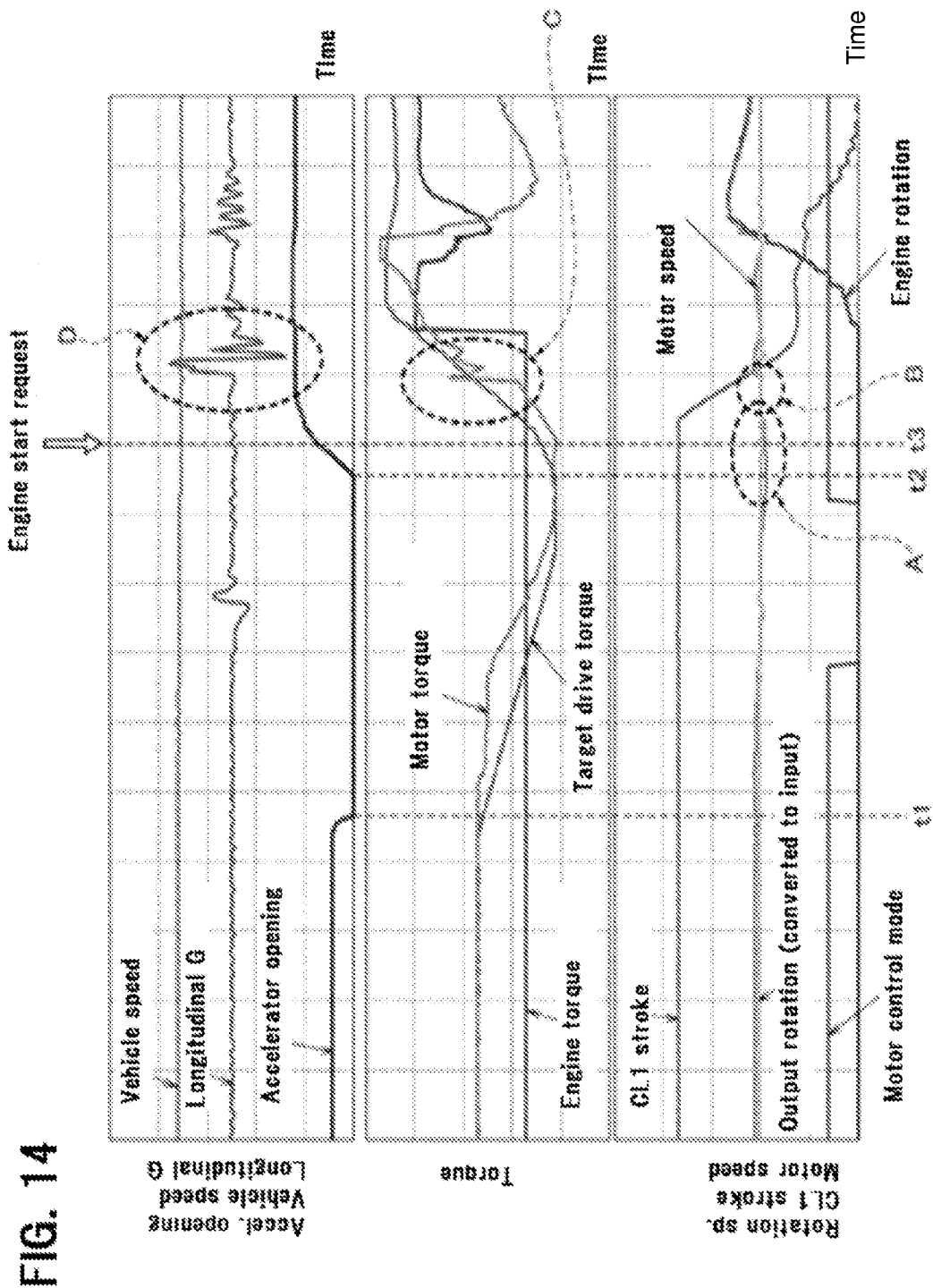
FIG. 14 is a timing chart in a comparative example, when there is an engine start request in response to accelerator depression or increase during coast running with CL2 being slipped in negative at EV running or travel, showing an accelerator opening, vehicle speed, longitudinal G, torque (motor torque, engine torque, and target drive torque), rotation speed (output shaft rotation speed, motor rotation speed), CL1 stroke, and motor control mode, respectively.

When there is the engine start request due to the accelerator being increased during a coast driving with CL2 maintained in slipping negative, in a comparative example, cranking will be started immediately upon engine start request in response to accelerator increase (FIG. 14).

In the coasting state with the accelerator being released from time t1 to time t2 in FIG. 14, when performing the EV travel while maintaining the μ slip control, the second clutch CL2 switches at somewhere between time t1 and time t2, from a positive slip (motor rotation speed>output shaft speed) to a negative slip (motor speed to <output shaft speed). In other words, coasting drive force is realized with the second clutch CL2 being negatively slipped.

However, when staring and depressing the accelerator at time t2, then, when an engine start request is made at time t3, as shown by the arrow A in FIG. 14, the second clutch CL2 is still in negative slip. If cranking of the engine would be started immediately in response to the engine start request in this state, immediately after the cranking start, in an area indicated by the arrow B in FIG. 14, a zero crossing state (motor speed=output shaft speed) occurs at which the slip state of the second clutch CL2 changes its polarity from negative to positive.

In the state of this zero crossing, since the input rotation speed and the output rotation speed across the second clutch CL2 are the same and the second clutch CL2 will be set in an engaged state so that the slip of the second clutch CL2 will disappear temporarily.

As a result, when fluctuation in motor torque (input torque) would occur accompanied by the engagement of the first clutch CL1 (see arrow C in FIG. 14), the blocking effect of the fluctuation torque by way of the slip engagement of the second clutch CL2 is not achieved, and the variation torque will be transmitted directly to drive wheels as it is via the second clutch CL2. Thus, as shown by arrow D in FIG. 14, longitudinal G fluctuates causing an engine start shock to be generated.

During an EV travel and when the target drive or running mode is being maintained in the "EV mode", in the flowchart shown in FIG. 13, the steps from S101, S102, and the End step are repeated. In step S102, the cranking start permission flag is kept off, i.e. cranking start permission flag=OFF.

Then, even upon change in the target drive or running mode from the "EV mode" to the "HEV mode" or "WSC mode" with subsequent generation of an engine start request, as long as the slip polarity of the second clutch 5 (CL2) remains negative, in the flowchart shown in FIG. 13, the steps from S101, S103, S102, and END step are reiterated. In other words, in step S102, the cranking start permission flag remains to be set OFF.

Further, even upon change in the slip polarity of the second clutch 5 (CL2) to positive, while the state in which input torque≤0, is maintained, in the flowchart of FIG. 13, control proceeds from step S101→S103→S104→S102→END, repeatedly. Stated another way, in step S102, the cranking start permission flag remains to be set OFF.

Subsequently, even when the slip polarity of the second clutch 5 (CL2) is positive, and even upon increase in the input torque to be larger than "zero", until the state that CL2 slip is larger than a threshold value has elapsed for a predetermined time, the flow of steps from S101, S103, S104, S105, S102 and END step is reiterated. Specifically, in step S102, the cranking start permission flag remains to be set OFF.

Finally, when each of the conditions are met, in which the slip polarity of the second clutch (CL2) is positive, the input torque is larger than "zero", and the state in which CL2 slip is larger than the threshold has elapsed for the predetermined time, then in the flowchart in FIG. 13, the flow of steps from S101, S103, S104, S105, S106 and END step is repeated. Consequently, in step S106, the cranking start permission flag will be switched from OFF to ON.

The cranking start permission control in the first embodiment is characterized in the following points.

(a) During the EV travel, when the target running mode changes to the "HEV mode" or "WSC mode", and the slip polarity of the second clutch 5 (CL2) is determined negative, the start of cranking will be withheld or delayed until the slip polarity assumes a positive value.

(b) In step S101 where an engine start request is received in response to change in the target running mode, a slip facilitating or promoting torque of the second clutch 5 (CL2) will be added to the target drive torque to set a target input torque.

(c) In step S103 where the slip polarity of the second clutch 5 (CL2) becomes positive along with change in the polarity of the drive torque to positive, control of motor rotation speed by motor/generator 2 will be started.

(d) In step S104 where the polarity of the input torque becomes positive, the engagement of the first clutch 4 (CL1) will be started.

The operation of the cranking start permission control in the first embodiment will now be described with reference to the time chart in FIG. 15 showing each characteristic when there is engine start request by the accelerator increase during EV travel where the coast drive force is being realized with slipping of the clutch CL2 on the negative.

In the coasting state with the accelerator being released between time t1 and t2 in FIG. 15, performing the EV travel while maintaining the μ slip control will cause the second clutch to switch from a positive slip (i.e., motor rotation speed>output shaft speed) to a negative slip (i.e., motor speed<output shaft speed) at somewhere between time t1 and time t2 in FIG. 15. Specifically, the coast drive force is available while the slip of the second clutch CL2 is held in a negative slip.

However, when starting the accelerator depression operation at time t2, then, when an engine start request is made at time t3, as shown by arrow E in FIG. 15, the second clutch CL2 is still in negative slip. When the slip of the second clutch CL2 is negative, the start of cranking of the engine 1 will be withheld or sustained. Then, in the area shown by the arrow F in FIG. 15, if there is a change in the slip polarity of the second clutch CL2 from negative to positive along with a confirmation that the polarity of drive torque is positive, as shown in the motor control mode characteristic in FIG. 15, the motor rotation speed control will be started. Thus, when the slip polarity of the second clutch slip 5 (CL2) is positive, and the condition that input torque is larger than "zero", with subsequent satisfaction of the condition that the state in which CL2 slip is larger than a threshold value has elapsed for a predetermined time at time t4, the cranking start permission flag will be set ON and engine start control will be initiated without being subjected to any restraints.

As a result, even when variations in motor torque (input torque) associated with engagement of the first clutch CL1 occurs, blocking effect of the fluctuation torque by way of the slip engagement of the second clutch CL2 is exhibited so that fluctuation torque is blocked by the second clutch CL2. Therefore, as shown by the arrow I in FIG. 15, the variation in the longitudinal G is suppressed, and the engine starting shock is thus reduced.

As described above, in the first embodiment, when an engine start request is made in response to drive force request associated with accelerator opening increase, and when the slip polarity of the second clutch 5 (CL2) is negative, such a configuration is adopted in which start of engine cranking will be delayed until the slip polarity becomes positive.

In other words, when the slip polarity of the second clutch 5 (CL2) is negative, if cranking would be started immediately, then, due to zero crossing, the slip of the second clutch 5 (CL2) will be lost temporarily, thus causing reduction in the blocking effect of input torque. Therefore, the start of cranking operation will be sustained. Thus, during the slip polarity of the second clutch 5 (CL2) being negative, the start of cranking will be withheld so that the engine starting shock may be reduced.

In the first embodiment, such a configuration is adopted in which when the slip polarity of the second clutch 5 (CL2) becomes positive along with the polarity of the drive torque changing to positive, the motor rotation speed control will be initiated by motor/generator 2.

Stated another way, when the slip polarity of the second clutch 5 (CL2) becomes positive from negative, and, when the polarity of the drive torque becomes positive, the cause of zero crossing that would reduce the blocking effect of input torque will be eliminated.

Therefore, due to the elimination of the factor of reduction in input torque blocking effect, the engine starting shock will be reduced reliably.

In the first embodiment, such a configuration is further adopted in which the engagement of the first clutch 4 (CL1) is started upon the polarity of the input torque becoming positive.

In other words, in consideration not only of the magnitude relationship on absolute basis between the motor torque and the capacity of the second clutch 5 (CL2), but also of the post polarity of the slip rotation speed after slipping of the second clutch 5 (CL2), the engagement of the first clutch 4 (CL1) will be initiated.

Therefore, due to elimination of the cause associated with the slip rotation polarity of the second clutch 5 (CL2) to reduce the blocking effect of the input torque, the engine starting shocks will be reduced reliably.

In the first embodiment, upon an engine start request associated with change in target running or drive mode, such a configuration is adopted in which a slip promoting torque of the second clutch 5 (CL2) is added to the target drive torque to set as a target input torque.

In other words, the add-on of the slip promoting torque will ensure a slip of the second clutch 5 (CL2) even in a low torque region or range with low hydraulic pressure control accuracy.

Thus, due to the slip promotion of the second clutch 5 (CL2), engine start shock is reduced reliably even when the engine is started in the low torque region.

Now, the effects will be described. In a hybrid electric vehicle according to the first embodiment, it is possible to obtain the following effects.

(1) It is provided with an engine 1, a motor (motor generator 2), a first clutch 4 interposed between the engine 1 and the motor (motor generator 2) to be engaged when starting the engine using the motor (motor/generator 2) as a starter motor; a second clutch 5 interposed between the motor (motor/generator 2) and drive wheels (tires 7, 7) to be slip-engaged at the engine start timing; and a cranking start permission control unit (FIG. 13) that causes the engine start cranking of the engine 1 to wait until the slip polarity becomes positive, when the engine start request is made in response to a drive force request associated with accelerator opening increase and the slip polarity of the second clutch 5 is negative.

Therefore, in response to an engine stat request with the second clutch being negative in the slip polarity, the engine start shock may be alleviated.

(2) The cranking start permission control unit (FIG. 13) allows to start control of the rotation speed of the motor (motor/generator 2) when both the slip polarity of the second clutch 5 (CL2) and the polarity of drive torque become positive (see step S103). Thus, in addition to the effect described in (1), due to elimination of zero-crossing factor that would reduce the blocking effect of the input torque, engine start shock may be reduced securely.

(3) The cranking start permission control unit (FIG. 13) starts to engage the first clutch 4 when the polarity of the input torque becomes positive (step S104). Therefore, in addition to effects of (1) and (2), due to elimination of the slip rotation speed polarity factor of the second clutch 5 that would reduce the blocking effect of the input torque, engine start shock may be reduced reliably.

(4) The target input torque control unit (step S08) is provided to control the target input torque to the second clutch 5 (step S08). The cranking start permission control unit (FIG.

13) is configured to set as a target input torque by adding a slip promoting torque of the second clutch 5 to the target drive torque (FIG. 12).

Therefore, in addition to the effects in (1) through (3), due to a slipping facilitation or promotion of the second clutch 5 (CL2) that is intended for blocking effect in the low input torque region, engine start shock may be reduced securely.

The control device for a hybrid vehicle according to the present invention has been described above with reference to the first embodiment. The specific structure is not limited to this embodiment, however. Rather, change in design or addition, etc., may be allowable without departing the gist or spirit of the invention as they relate to each claim described in the claims.

In the first embodiment, such an example is illustrated in which the cranking start permission control mechanism allows the cranking start permission flag to change or switch from OFF to ON when respective conditions in which the polarity of the second clutch 5 (CL2) is positive, input torque is larger than "zero", and the state, in which CL2 slip is larger than a threshold value, has elapsed for a predetermined time have been met. However, with respect to the cranking start permission control mechanism may be set to wait for a predetermined time set by a timer from an engine start request, when the slip polarity of the second clutch CL2 is negative at engine start request. Further, when the slip polarity of the second clutch is negative at the engine start request, with respect to each operation associated with the engine start control execution, different conditions may be set and a delay time may be provided for each condition being satisfied.

In the first embodiment, the present invention is applied to such a hybrid vehicle with rear wheel drive of one-motor, two-clutch type in which a first clutch is interposed between engine and motor/generator. However, the present invention may be applicable to a hybrid vehicle with front wheel drive with a power train system of one-motor, two-clutch type.

The invention claimed is:

1. A control device for a hybrid vehicle comprising:
    an engine;
    a motor;
    a first clutch interposed between the engine and the motor to be engaged when starting the engine using the motor as a starter motor;
    a second clutch interposed between the motor and drive wheels to be slip-engaged when starting the engine; and
    when an engine start request is made in response to a drive force request associated with an increase in an accelerator opening and a slip polarity of the second clutch is negative, a cranking start permission control mechanism configured to withhold starting of the engine cranking until the slip polarity of the second clutch becomes positive.

2. The control device for a hybrid vehicle as claimed in claim 1, wherein the cranking start permission control mechanism is further configured to allow rotation speed control of the motor to start when both the slip polarity of the second clutch and a polarity of a drive torque become positive.

3. The control device for a hybrid vehicle as claimed in claim 1,
    wherein the cranking start permission control mechanism starts to engage the first clutch when a polarity of an input torque becomes positive.

4. The control device for the hybrid vehicle as claimed in claim 1, further comprising:
    a target input torque control mechanism configured to control a target input torque to the second cutch and to set the target input torque by adding a slip promoting torque of the second clutch to a target drive torque.

* * * * *